(12) United States Patent
Choi et al.

(10) Patent No.: US 11,393,392 B2
(45) Date of Patent: Jul. 19, 2022

(54) DISPLAY DEVICE AND METHOD OF OPERATING THE SAME

(71) Applicant: SAMSUNG DISPLAY CO., LTD., Yongin-si (KR)

(72) Inventors: Eunjin Choi, Yongin-si (KR); Wonjin Seo, Seoul (KR); Kihyun Pyun, Gwangmyeong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/321,061

(22) Filed: May 14, 2021

(65) Prior Publication Data

US 2022/0028332 A1 Jan. 27, 2022

(30) Foreign Application Priority Data

Jul. 24, 2020 (KR) .................. 10-2020-0092469

(51) Int. Cl.
*G09G 3/3208* (2016.01)
*G06F 1/3218* (2019.01)
*H04N 5/63* (2006.01)

(52) U.S. Cl.
CPC ......... *G09G 3/3208* (2013.01); *G06F 1/3218* (2013.01); *H04N 5/63* (2013.01); *G09G 2320/0686* (2013.01); *G09G 2330/021* (2013.01)

(58) Field of Classification Search
CPC ......... G09G 3/3208; G09G 2320/0686; G09G 2330/021; G09G 2320/0626; G09G 2360/16; G06F 1/3218; H04N 5/63
See application file for complete search history.

(56) References Cited

U.S. PATENT DOCUMENTS

| | | | | |
|---|---|---|---|---|
| 2003/0030655 | A1* | 2/2003 | Ooe ..................... | G09G 3/2944 345/690 |
| 2003/0218432 | A1* | 11/2003 | Song .................... | G09G 3/2944 315/169.1 |
| 2010/0052564 | A1* | 3/2010 | Park ................... | H05B 41/2822 315/291 |
| 2010/0128051 | A1* | 5/2010 | Mizuta ................ | G09G 3/3413 345/589 |
| 2015/0255019 | A1* | 9/2015 | Park ..................... | G09G 3/3225 345/208 |
| 2018/0286341 | A1* | 10/2018 | Nagasaka ............ | G09G 3/3688 |
| 2021/0201815 | A1* | 7/2021 | Bong ................... | G09G 3/2092 |

FOREIGN PATENT DOCUMENTS

| | | |
|---|---|---|
| KR | 10-2010-0052833 | 5/2010 |
| KR | 10-2018-0002948 | 1/2018 |

* cited by examiner

*Primary Examiner* — Amit Chatly
(74) *Attorney, Agent, or Firm* — F. Chau & Associates, LLC (57) ABSTRACT

A display device includes a display panel including a plurality of panel blocks, a block load calculator which calculates block loads of the panel blocks based on an input image data and determines a maximum block load among the block loads, a block load comparing part which generates a first output image data based on the input image data when the maximum block load is less than a critical block load, and a first load controller which generates a first power control curve and generates a second output image data based on the input image data when the maximum block load is greater than or equal to the critical block load.

18 Claims, 7 Drawing Sheets

DISPLAY DEVICE AND METHOD OF OPERATING THE SAME

CROSS-REFERENCE TO RELATED APPLICATION(S)

This application claims priority under 35 U.S.C. § 119 to Korean Patent Application No. 10-2020-0092469, filed on Jul. 24, 2020, in the Korean Intellectual Property Office (KIPO), the disclosure of which is incorporated by reference herein in its entirety.

TECHNICAL FIELD

Embodiments of the present disclosure relate generally to a display device and a method of operating the same. More particularly, embodiments of the present disclosure relate to the display device which prevents damage to a display panel.

DISCUSSION OF THE RELATED ART

A display device includes a display panel, and the display panel includes a plurality of pixels. Each of the pixels may emit light, and the light may have a luminance corresponding to a driving current. As the luminances of the lights emitted by the pixels increase, the driving currents increase. Accordingly, power consumed by the display panel increases. Power consumption of a display panel at a moment during operating time may be referred to as a panel load. Since the panel load of the display panel increases as driving currents increase, heat generation of the display panel may increase.

Depending on the image displayed on the display panel, the distribution of the panel load may not be constant within the display panel. For example, when the display panel is divided into a plurality of panel blocks, the panel load may be concentrated to one panel block. In this case, even when the total panel load is less than the critical panel load, concentrated load to one panel block may cause damage to the display panel.

SUMMARY

Embodiments of the present disclosure provide a display device capable of reducing power consumption.

A display device according to an embodiment of the present disclosure may include a display panel including a plurality of panel blocks, a block load calculator which calculates block loads of the panel blocks based on an input image data and determines a maximum block load among the block loads, a block load comparing part that determines if the maximum block load is less than a critical block load, and generates a first output image data based on the input image data when the maximum block load is less than a critical block load, and a first load controller which generates a first power control curve and generates a second output image data based on the input image data and the first power control curve, when the maximum block load is greater than or equal to the critical block load.

According to an embodiment of the present disclosure, the first load controller may include a block load difference calculator which calculates a first block load difference between a first block load of a first panel block and the maximum block load, and calculates a second block load difference between a second block load of a second panel block and the maximum block load, a power control curve generator which generates the first power control curve based on the maximum block load, the first block load difference, and the second block load difference, and a load controller which generates the second output image data, based on the input image data and the first power control curve.

According to an embodiment of the present disclosure, the first and second panel blocks may be adjacent to a panel block having the maximum block load.

According to an embodiment of the present disclosure, the display device may further include a panel load calculator which calculates a panel load of the display panel based on the input image data and a panel load comparing part which compares the panel load and a critical panel load.

According to an embodiment of the present disclosure, the panel load may be equal to a sum of the block loads.

According to an embodiment of the present disclosure, the block load calculator may calculate the block loads and may determine the maximum block load, when the panel load is greater than or equal to the critical panel load.

According to an embodiment of the present disclosure, the block load calculator may not calculate the block loads, when the panel load is greater than or equal to the critical panel load.

According to an embodiment of the present disclosure, the display device may further include a second load controller which generates a third output image data based on the input image data and a second power control curve when the panel load is greater than or equal to the critical panel load.

According to an embodiment of the present disclosure, the display device may further include a data driver which generates a data voltage based on the first output image data or the second output image data.

According to an embodiment of the present disclosure, an area of each of the panel blocks is the same for each block.

According to an embodiment of the present disclosure, the display panel may include four panel blocks.

A method of operating a display device according to an embodiment of the present disclosure may include calculating block loads of panel blocks based on an input image data, determining a maximum block load among the block loads, generating a first output image data based on the input image data when the maximum block load is less than a critical block load, and generating a first power control curve and generating a second output image data based on the input image data and the first power control curve, when the maximum block load is greater than or equal to the critical block load.

According to an embodiment of the present disclosure, generating the second output image data may include calculating a first block load difference between a first block load of a first panel block and the maximum block load, and calculating a second block load difference between a second block load of a second panel block and the maximum block load and generating the first power control curve based on the maximum block load, the first block load, and the second block load.

According to an embodiment of the present disclosure, the method may further include calculating a panel load of a display panel based on the input image data and comparing the panel load and a critical panel load, before calculating the block loads of the panel blocks based on the input image data.

According to an embodiment of the present disclosure, the panel load may be equal to a sum of the block loads.

According to an embodiment of the present disclosure, calculating the block loads of the panel blocks based on the input image data may be performed when the panel load is less than the critical panel load.

According to are embodiment of the present disclosure, calculating the block loads of the panel blocks based on the input image data may not be performed when the panel load is greater than or equal to the critical panel load.

According to an embodiment of the present disclosure, the method may further include generating a third output image data based on the input image data and a second power control curve, when the panel load is greater than or equal to the critical panel load.

According to an embodiment of the present disclosure, the method may further include generating a data voltage based on the first output image data or the second output image data.

BRIEF DESCRIPTION OF THE DRAWINGS

The accompanying drawings, which are included to provide a further understanding of the present disclosure and are incorporated in and constitute a part of this specification, illustrate embodiments of the present disclosure, and together with the description serve to explain the inventive concepts.

DETAILED DESCRIPTION

Illustrative, non-limiting embodiments of the present disclosure will be more clearly understood from the following detailed description with reference to the accompanying drawings. It is to be understood that the elements shown in the drawings, e.g., the elements shown in blocks in FIGS. 1 and 3-5 may each be implemented as individual circuits or part of a circuit.

Figure 1:
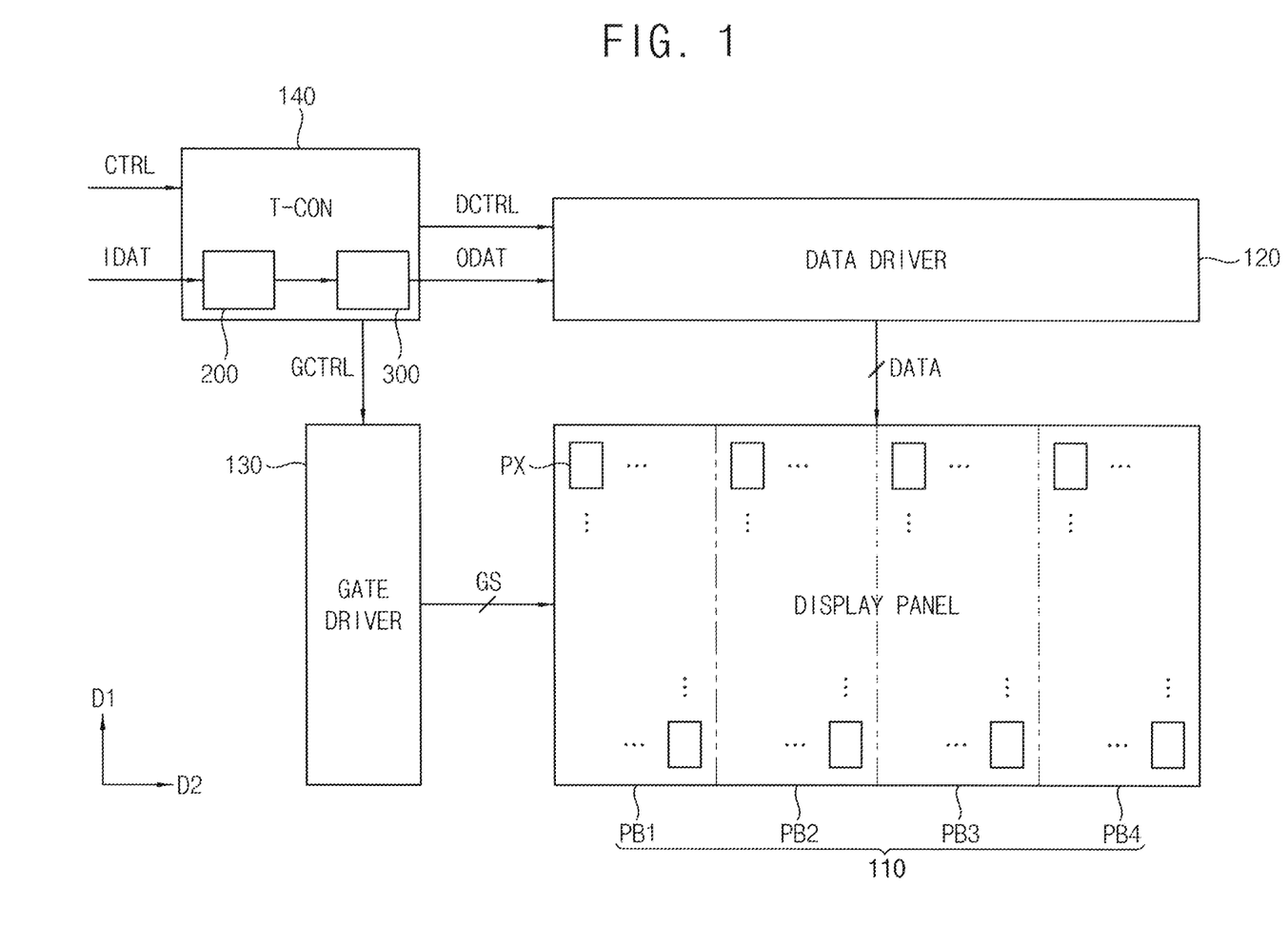
FIG. 1 is a block diagram illustrating a display device according to an embodiment of the present disclosure.
Figure 2:
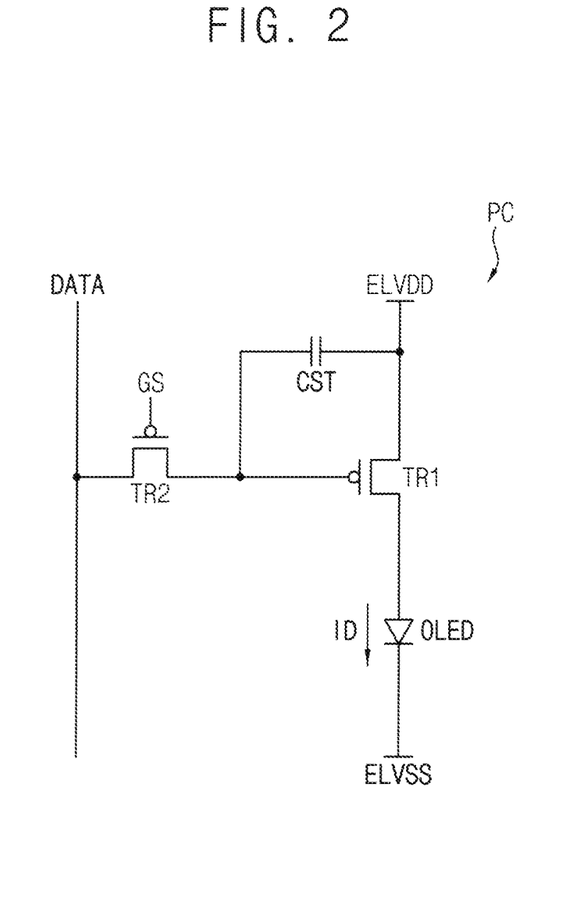
FIG. 2 is a circuit diagram illustrating a pixel circuit for driving a pixel included in the display device of FIG. 1.

FIG. 1 is a block diagram illustrating a display device according to an embodiment of the present disclosure. FIG. 2 is a circuit diagram illustrating a pixel circuit for driving a pixel included in the display device of FIG. 1.

Referring to FIG. 1, a display device 1000 according to an embodiment of the present disclosure may include a display panel 110, a data driver 120, a scan driver 130, and a controller 140. The controller 140 may include a first panel load controller 200 and a second panel load controller 300.

The display panel 110 may include a plurality of panel blocks. In an embodiment of the present disclosure, the display panel 110 may include four panel blocks. For example, the display panel 110 may include a first panel block PB1, a second panel block PB2, a third panel block PB3, and a fourth panel block PB4. The first to fourth panel blocks PB1, PB2, PB3, and PB4 may display first to fourth images, and in some cases, a user may view an image that is a combination of the first through fourth images.

Each of the first to fourth panel blocks PB1, PB2, PB3, and PB4 may include a plurality of data lines, a plurality of gate lines, and a plurality of pixels PX. The data lines may extend in a first direction D1, and the gate lines may extend in a second direction D2. The pixels PX may be formed at a point where the data lines and the gate lines cross. The pixels PX may be electrically connected to the data lines and the gate lines.

In an embodiment of the present disclosure, each of the first to fourth panel blocks PB1, PB2, PB3, and PB4 may have a rectangular shape. For example, the first to fourth panel blocks PB1, PB2, PB3, and PB4 may extend in the first direction D1 and may be adjacent to each other in the second direction D2.

In an embodiment of the present disclosure, each of the first to fourth panel blocks PB1, PB2, PB3, and PB4 may have the same area. For example, each of the first to fourth panel blocks PB1, PB2, PB3, and PB4 may include the same number of pixels PX.

However, the number, the shape, and area of the panel blocks are not limited to those described above. For example, the number of panel blocks may be more than four or less than four. The panel blocks may extend in the second direction D2 and may be adjacent to each other in the first direction D1, or may form a matrix pattern and extend in first direction D1 as well as second direction D2, and may be adjacent to each other along both directions. Additionally or alternatively, areas of each of the panel blocks may be different from each other. For example, each of the panel blocks may include a different number of the pixels PX.

Referring to FIG. 2, a pixel circuit PC for driving the pixel PX may include at least one transistor, at least one storage capacitor, and a light emitting diode. For example, the pixel circuit PC may include a first transistor TR1, a second transistor TR2, a storage capacitor CST, and an organic light emitting diode OLED.

The first transistor TR1 may include a first terminal (e.g., a source terminal) receiving a high power voltage ELVDD, a second terminal (e.g., a drain terminal) connected to the organic light emitting diode OLED, and a gate terminal connected to the second transistor TR2. The first transistor TR1 may generate a driving current ID based on the high power voltage ELVDD and the data voltage DATA.

The second transistor TR2 may include a first terminal (e.g., a source terminal) receiving the data voltage DATA, a second terminal (e.g., a drain terminal) connected to the first transistor TR1, and a gate terminal receiving the gate signal GS. The second transistor TR2 may provide the data voltage DATA to the first transistor TR1 based on the gate signal GS.

The storage capacitor CST may include a first terminal connected to the first terminal of the first transistor TR1 and a second terminal connected to the gate terminal of the first transistor TR1. The storage capacitor CST may store a voltage difference between a gate voltage of the first transistor TR1 and a source voltage of the first transistor TR1.

The organic light emitting diode OLED may include a first terminal (e.g., an anode terminal) connected to the first transistor TR1 and a second terminal (e.g., a cathode terminal) connected to a low power supply voltage ELVSS. The organic light emitting diode OLED may emit light, and the light may have a luminance corresponding to the driving current ID. For example, as the driving current ID increases, the luminance of the light may increase.

Referring to FIG. 1 again, the data driver 120 may generate the data voltage DATA based on an output image data ODAT. In addition, the data driver 120 may provide the data voltage DATA to the display panel 110 based on a data control signal DCTRL. In an embodiment of the present disclosure, the output image data ODAT may be any one of a first output image data (e.g., a first output image data ODAT1 of FIG. 3), a second output image data (e.g., a second output image data ODAT2 of FIG. 4), and a third output image data (e.g., a third output image data ODAT3 of FIG. 4). The data control signal DCTRL may include an output data enable signal, a horizontal start signal, and a load signal.

The gate driver 130 may generate the gate signal GS based on the gate control signal GCTRL. In addition, the gate driver 130 may provide the gate signal GS to the display panel 110. For example, the gate signals GS may be sequentially provided to the display panel 110. For example, the gate signal GS may include a vertical start signal, a clock signal, and the like.

The controller 140 may generate the output image data ODAT based on the input image data IDAT. In addition, the controller 140 may generate the data control signal DCTRL and the gate control signal GCTRL based on the control signal CTRL. For example, the input image data IDAT may include gray scale values of the pixels PX. Additionally or alternatively, the input image data IDAT may include red grayscale data, green grayscale data, and blue grayscale data. For example, the control signal CTRL may include a vertical synchronization signal, a horizontal synchronization signal, an input data enable signal, a master clock signal, and the like.

In an embodiment of the present disclosure, the controller 140 may include the first panel load controller 200 and the second panel load controller 300.

The first panel load controller 200 may calculate the panel load PLD of the display panel 110 based on the input image data IDAT. The first panel load controller 200 may generate the first output image data when the panel load PLD is greater than or equal to a preset critical panel load CPLD. In this case, the second panel load controller 300 may not be activated.

The second panel load controller 300 may be activated when the panel load PLD is less than the critical panel load CPLD. The second panel load controller 300 may calculate block loads of the panel blocks based on the input image data IDAT. For example, the second panel load controller 300 may calculate a first block load BLD1 of a first panel block PB1, a second block load BLD2 of a second panel block PB2, a third block load BLD3 of a third panel block PB3, and a fourth block load BLD4 of a fourth panel block PB4, based or the input image data IDAT. In addition, the second panel load controller 300 may determine a maximum block load among the first to fourth block loads BLD1, BLD2, BLD3, and BLD4. For example, the second panel load controller 300 may determine the second block load BLD2 to be the maximum block load. In addition, the second panel load controller 300 may generate the second output image data when the maximum block load BLD2 is greater than or equal to a critical block load CBLD. Alternatively, the second panel load controller 300 may generate the third output image data when the maximum block load BLD2 is less than the critical block load CBLD. Hereinafter, the first and second panel load controller 200 and 300 will be described.

Figure 3:
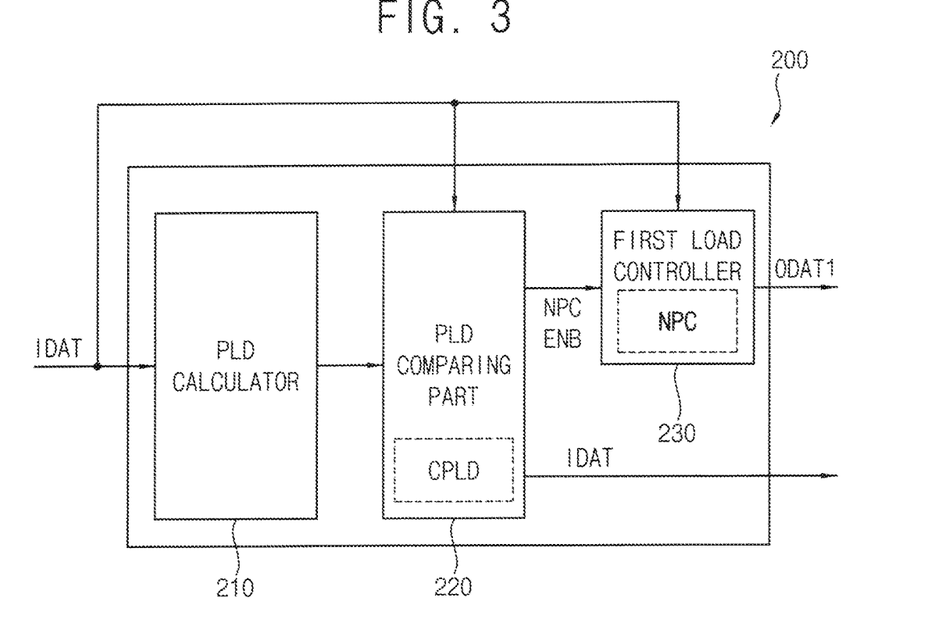
FIG. 3 is a block diagram illustrating a first panel load controller included in the display device of FIG. 1.
Figure 4:
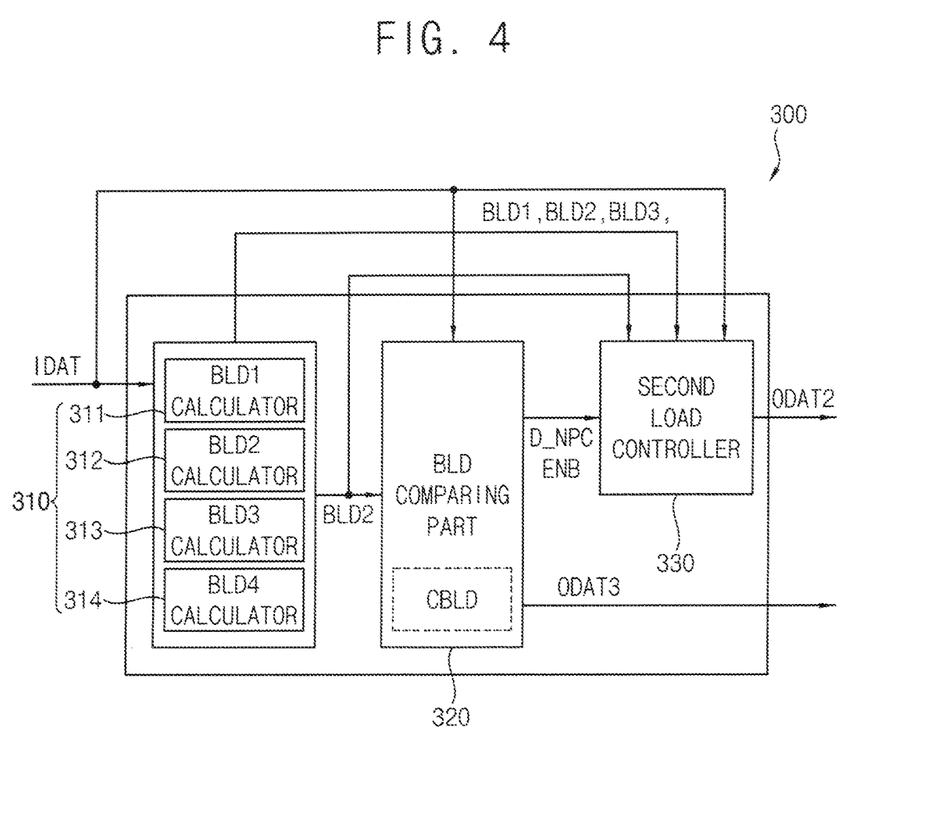
FIG. 4 is a block diagram illustrating a second panel load controller included in the display device of FIG. 1.
Figure 5:
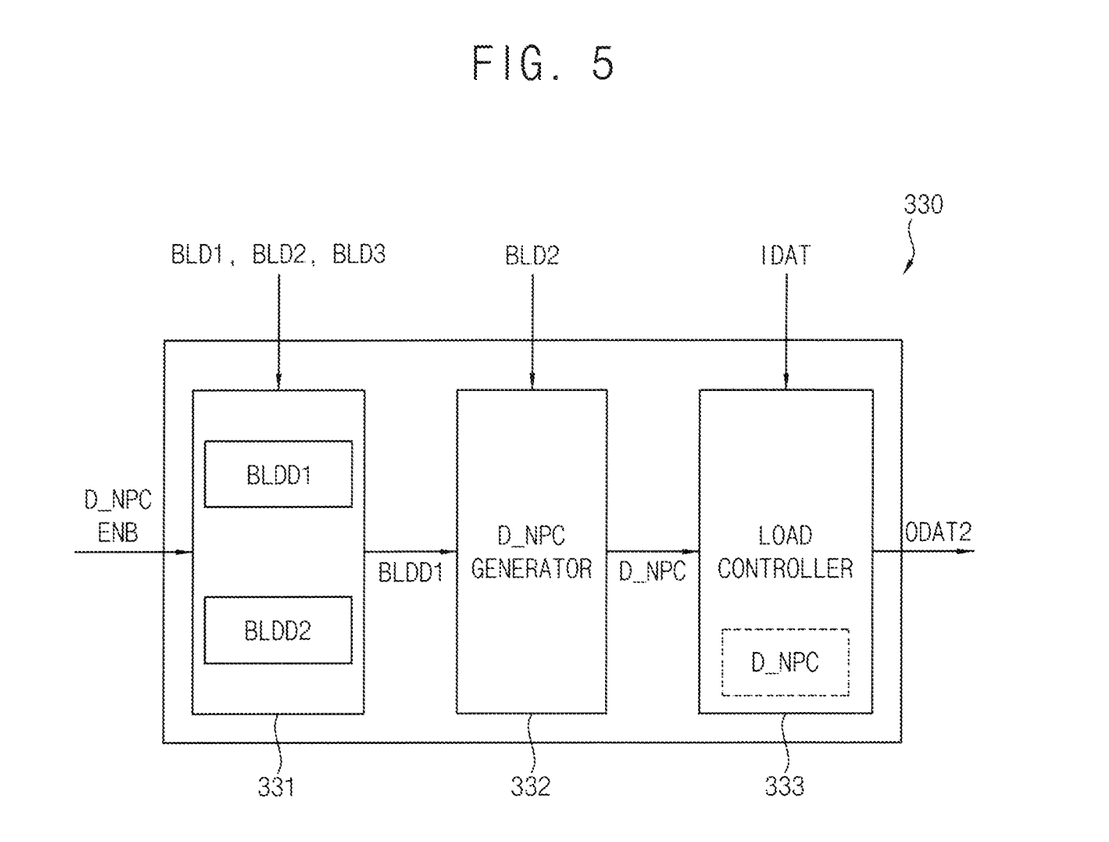
FIG. 5 is a block diagram illustrating a second load controller included in the second panel load controller of FIG. 4.

FIG. 3 is a block diagram illustrating a first panel load controller included in the display device of FIG. 1. FIG. 4 is a block diagram illustrating a second panel load controller included in the display device of FIG. 1. FIG. 5 is a block diagram illustrating a second load controller included in the second panel load controller of FIG. 4.

Referring to FIGS. 1 and 3, the first panel load controller 200 may include a panel load calculator 210, a panel load comparing part 220, and a first load controller 230.

The panel load calculator 210 may calculate the panel load PLD based on the input image data IDAT. For example, the pixels PX may output lights having luminances corresponding to gray scale values included in the input image data IDAT. As the brightness of the lights increases, the driving currents ID may increase. As the sum of the driving currents ID increases, power consumed by the display panel 110 may increase. Accordingly, the panel load calculation calculator 210 may calculate the panel load PLD based on the input image data IDAT.

The panel load comparing part 220 may compare the panel load PLD and the critical panel load CPLD. The critical panel load CPLD may be stored in the panel load comparing part 220 and may be set during a manufacturing process of the display device 1000. When the panel load PLD is greater than or equal to the critical panel load CPLD, the panel load comparing part 220 may transmit a first power control enable signal NPC ENB to the first load control unit 230. When the panel load PLD is less than the critical panel load CPLD, the panel load comparing part 220 may transmit the input image data IDAT to the second panel load controller 300.

The first load controller 230 may be activated based on the first power control enable signal NPC ENB. For example, the first load controller 230 may be activated when the panel load PLD is greater than or equal to the critical panel load CPLD. Alternatively, the first load controller 230 may be deactivated when the panel load PLD is less than the critical panel load CPLD.

Figure 9:
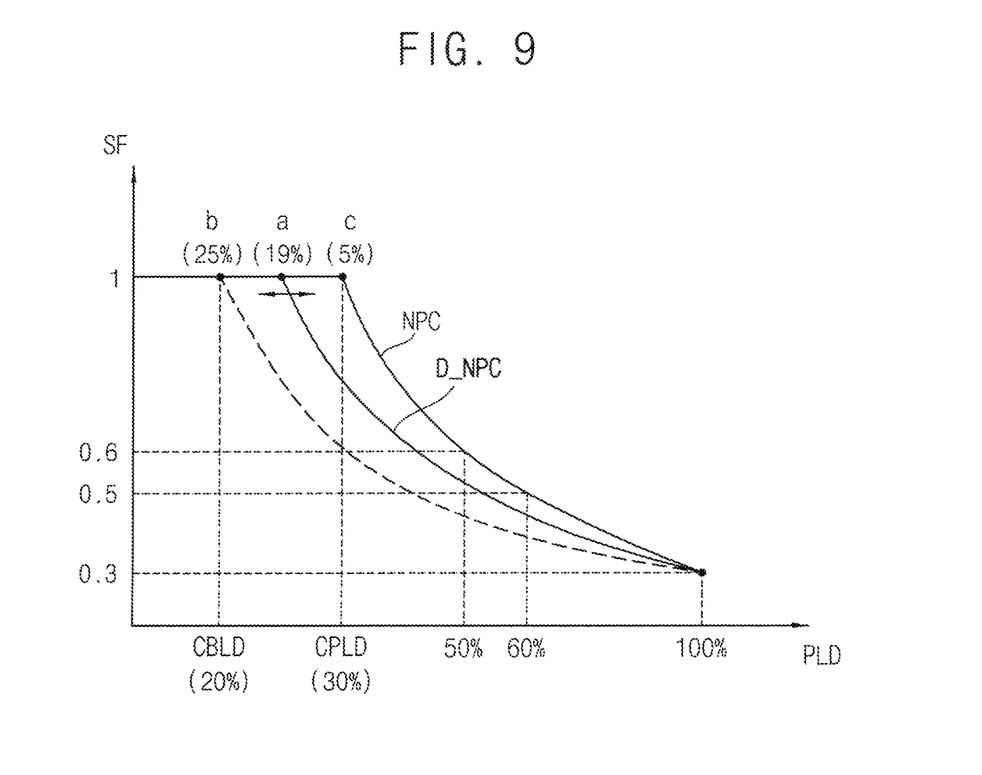
FIG. 9 is a graph illustrating first and second power control curve for driving the display panel of FIG. 7.

When the first load controller 230 is activated, the first load controller 230 may generate the first output image data ODAT1 based on the input image data IDAT and a first power control curve (e.g., a first power control curve NPC in FIG. 9). The first output image data ODAT1 may be provided to the data driver 120. Accordingly, if an input image data IDAT will cause the total panel load to exceed the critical panel load CPLD if driven to the display panel 110, the first panel load controller 200 may prevent damage to the display panel 110 by intercepting the image data IDAT and providing output image data ODAT1 that will prevent the panel from reaching the critical panel load. The first power control curve will be described with reference to FIG. 9.

Referring to FIGS. 1 and 4, the second panel load controller 300 may include a block load calculator 310, a block load comparing part 320, and a second load controller 330.

The block load calculator 310 may calculate the block loads BLD based on the input image data IDAT. For example, when the display panel 110 includes first to fourth panel blocks PB1, PB2, PB3, and PB4, the block load calculator 310 may include first to fourth block load calculators 311, 312, 313, and 314. The first block load calculator 311 may calculate the first block load BLD1, and the second block load calculator 312 may calculate the second block load BLD2, the third block load calculator 313 may calculate the third block load BLD3, and the fourth block load calculator 314 may calculate the fourth block load BLD4. In addition, the block load calculator 310 may determine the second block load BLD2 to be the maximum block load among the first to fourth block loads BLD1, BLD3, and BLD4.

The block load comparing part 320 may compare the maximum block load BLD2 and the critical block load CBLD. The critical block load CBLD may be stored in the block load comparing part 320 and may be set during the manufacturing process of the display device 1000. When the maximum block load BLD2 is greater than or equal to the critical block load CBLD, the block load comparing part 320 may transmit a second power control enable signal D_NPC ENB to the second load controller 330. When the maximum block load BLD2 is less than the critical block load CBLD, the block load comparing part 320 may generate the third output image data ODAT3 based on the input image data IDAT. The third output image data ODAT3 may be provided to the data driver 120.

Referring to FIGS. 1, 4, and 5, the second load controller 330 may include a block load difference calculator 331, a power control curve generator 332, and a load controller 333.

The second load controller 330 may be activated according to the second power control enable signal D_NPC ENB. For example, the second load controller 330 may be activated when the maximum block load D2 is greater than or equal to the critical block load CBLD. Alternatively, the second load controller 330 may be deactivated when the maximum block load BLD2 is less than the critical block load CBLD.

When the second load controller 330 is activated, the block load difference calculator 331 may calculate a block load difference between the maximum block load and block loads of panel blocks adjacent to a panel block having the maximum block load. For example, the block load difference calculator 331 may calculate a first block load difference BLDD1 between the first block load BLD1 and the maximum block load BLD2. Additionally or alternatively, the block load difference calculator 331 may calculate a second block load difference BLDD2 between the third block load BLD3 and the maximum block load BLD2.

The power control curve generator 332 may generate a second power control curve a second power control curve D_NPC of FIG. 9) based on the maximum block load BLD2, the first block load difference BLDD1, and the second block load difference BLDD2.

The load controller 333 may generate the second output image data ODAT2 based on the input image data IDAT and the second power control curve. The second output image data ODAT2 may be provided to the data driver 120. Accordingly, if an input image data IDAT will cause any block load to exceed the critical block load CBLD if driven to the display panel 100, the second panel load controller 300 may prevent damage to the display panel 100 by intercepting the image data IDAT and providing output image data ODAT2 that will prevent any block from reaching critical block load. The second power control curve will be described with reference to FIG. 9.

Figure 6:
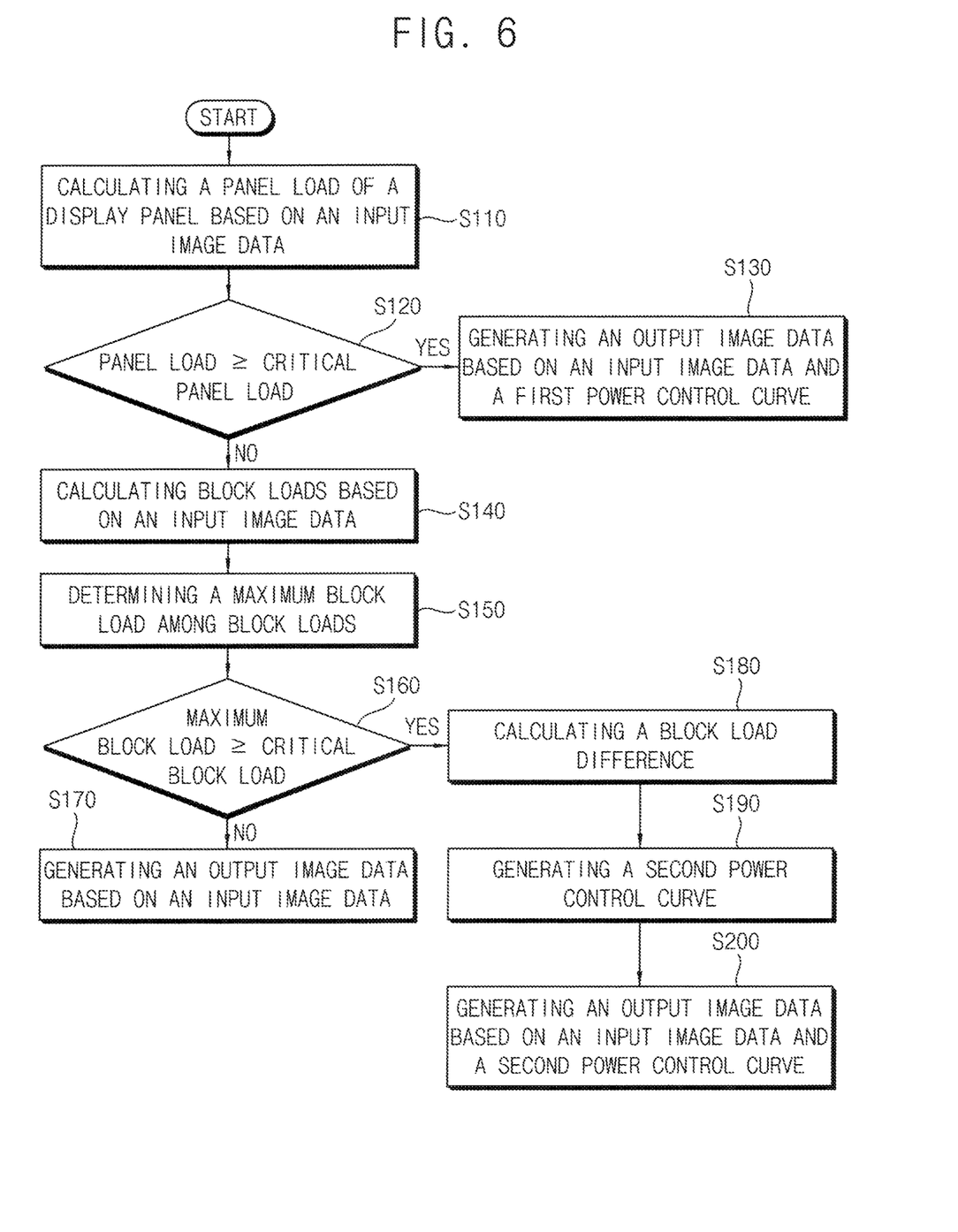
FIG. 6 is a flowchart illustrating a method of operating a display device according to an embodiment of the present disclosure.

FIG. 6 is a flowchart illustrating a method of operating a display device according to an embodiment of the present disclosure.

Referring to FIGS. 1, 3, 4, 5, and 6, in a method of operating the display device 1000, the panel load PLD of the display panel 110 may be calculated based on the input image data IDAT (S110). When the panel load PLD is greater than or equal to the critical panel load CPLD (S120: YES), the first output image data ODAT1 may be generated based on the input image data IDAT and the first power control curve (S130).

When the panel load PLD is less than the critical panel load CPLD (S120: NO), the first to fourth block loads BLD1, BLD2, BLD3, and BLD4 of the first to fourth panel blocks PB1, PB2, PB3, and PB4 may be calculated based on the input image data IDAT (S140). The maximum block load BLD2 among the first to fourth block loads BLD1, BLD2, BLD3, and BLD4 may be determined (S150). When the maximum block load BLD2 is less than the critical block load CBLD (S160: NO), the third output image data ODAT3 may be generated based on the input image data IDAT (S170).

When the maximum block load BLD2 is greater than or equal to the critical block load CBLD (S160: YES), the first block load difference BLDD1 and the second block load difference BLDD2 may be calculated (S180). For example, when the second block load BLD2 of the second panel block PB2 is the maximum block load, the first block load difference BLDD1 may be a difference between the second block load BLD2 and the first block load BLD1, and the second block load difference BLDD2 may be a difference between the second block load BLD2 and the third block load BLD3. The second power control curve may be generated based on the maximum block load BLD2, the first block load difference BLDD1, and the second block load difference BLDD2 (S190). The second output image data ODAT2 may be generated based on the input image data IDAT and the second power control curve (S200).

Figure 7:
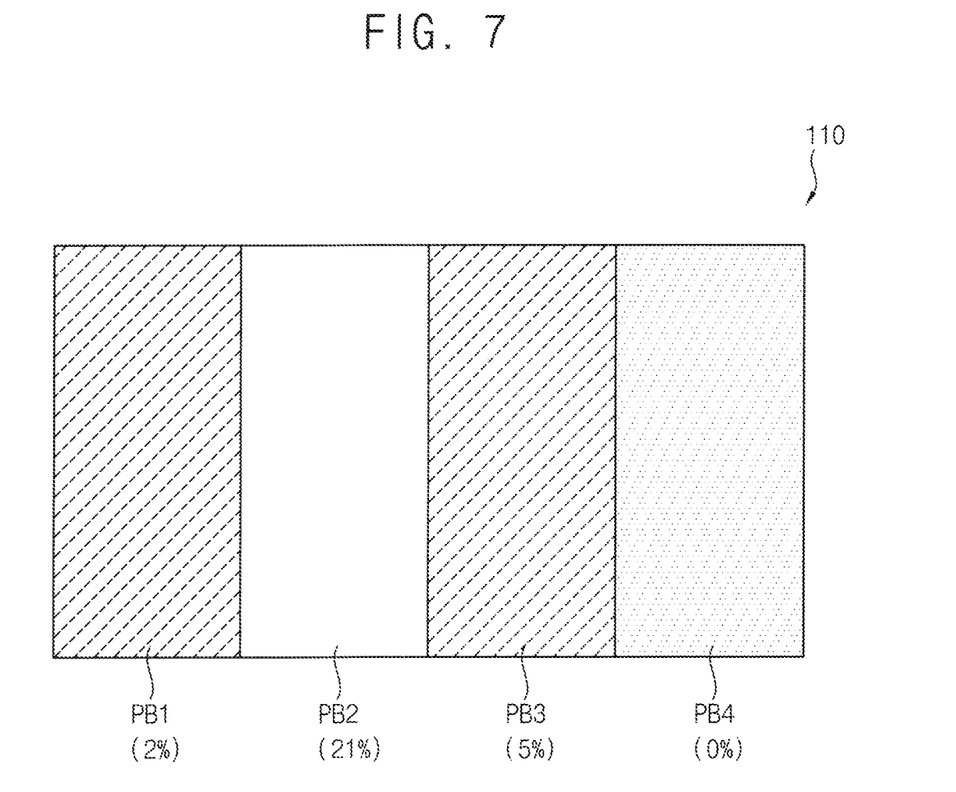
FIG. 7 is a diagram illustrating an example of a display panel included in the display panel of FIG. 1.
Figure 8:
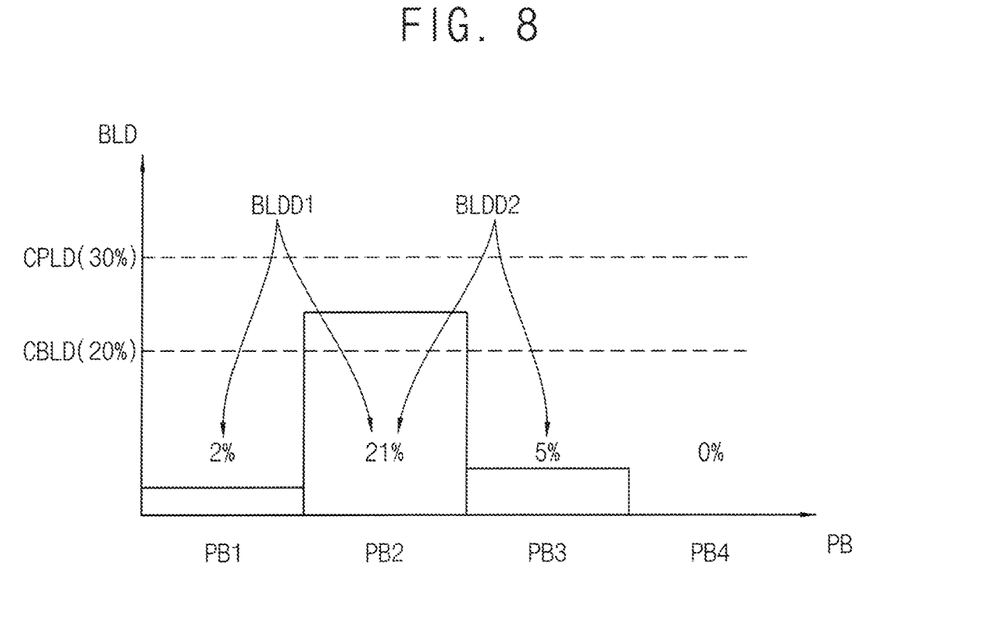
FIG. 8 is a graph illustrating an example of block loads and panel blocks included in the display panel of FIG. 7.

FIG. 7 is a diagram illustrating an example of a display panel included in the display panel of FIG. 1. FIG. 8 is a graph illustrating an example of block loads and panel blocks included in the display panel of FIG. 7. FIG. 9 is a graph illustrating first and second power control curve for driving the display panel of FIG. 7.

Referring to FIGS. 6, 7 and 8, the panel load PLD of the display panel 110 may be calculated to be about 28% based on the input image data IDAT (S110) in an example case of an embodiment of the present disclosure. When the critical panel load CPLD is 30%, the panel load PLD may be less than the critical panel load CPLD (S120: NO). In this case, as shown in FIG. 8, the first to fourth block loads BLD1, BLD2, BLD3 and BLD4 may be calculated based on the input image data IDAT (S140). For example, the first block load BLD1 may be about 2%, the second block load BLD2 may be about 21%, and the third block load BLD3 may be about 5%. The maximum block load BLD2 among the first to fourth block loads BLD1, BLD2, BLD3, and BLD4 may be determined (S150). When the critical block load CBLD is about 20%, the maximum block load BLD2 may be greater than equal to the critical block load CBLD (S160: YES). In this case, the first block load difference BLDD1 and the second block load difference BLDD2 may be calculated (S180). For example, the first block load difference BLDD1 may be 19% (=21%−2%), and the second block load difference BLDD2 may be 16% (=21%−5%).

Referring to FIGS. 6, 7, 8, and 9, the second power control curve D_NPC may be generated (S190). For example, the x-axis of the graph shown in FIG. 9 may represent the panel load PLD. The y-axis of the graph may represent a scale factor SF. For example, the scale factor SF may correspond to scaling the luminance of an image displayed on the display panel 110, power consumed by the display panel 110, a driving current flowing through the display panel 110, and the like.

The first power control curve NPC may be set during the manufacturing process of the display device 1000. For example, as shown in FIGS. 7 and 8, when the critical panel load CPLD is set to 30% and the panel load PLD is calculated to be about 28%, the scale factor SF may have a value of 1. When the panel load PLD is greater than or equal to the critical panel load CPLD, the scale factor SF may decrease as the panel load PLD increases. In an embodiment of the present disclosure, when the panel load PLD is greater than the critical panel load CPLD, a product of the panel load PLD and the scale factor SF may be constant. For example, when the critical panel load CPLD is set to 30% and the panel load PLD is calculated to be about 50%, the scale factor SF may have a value of 0.6. In addition, when the panel load PLD is calculated to be about 60%, the scale factor SF may have a value of 0.5. In addition, when the panel load PLD is calculated to be about 100%, the scale factor SF may have a value of 0.3. Accordingly, in each of these cases, the panel load will be 30% after scaling.

The second power control curve D_NPC may be generated while driving the display device 1000. In an embodiment of the present disclosure, when the maximum block load BLD2 is less than the critical block load CBLD, the scale factor SF may have a value of 1. When the maximum block load BLD2 is greater than the critical block load CBLD, the scale factor SF may decrease as the panel load PLD increases.

In an example, in the second power control curve D_NPC, a point (a) at which the scale factor SF is less than 1 may be set between a point (b) corresponding to the maximum block load difference and a point (c) corresponding to a minimum block load difference. The maximum block load difference may be calculated according to the number of the panel blocks included in the display panel 110. For example, when the display panel 110 includes four panel blocks, the maximum block load that can be applied to one panel block is 25%, and accordingly the maximum block load difference may be 25%. The minimum block load difference may be a difference value between the critical panel load CTRL and the maximum block load difference. For example, when the critical panel load CPBL is 30% and the maximum block load is 25%, the minimum block load difference may be 5%. The point (a) at which the scale factor SF is less than 1 may be set corresponding to the larger block load difference of the first block load difference BLDD1 and the second block load difference BLDD2, and may be set 19%, which is the greater of 19% and 16%. As the larger block load difference decreases, the point (a) may approach the point (c), and as the larger block load difference increases, the point (a) may approach the point (b). When the panel load PLD is about 100% as calculated from input image data, the scale factor SF of the first power control curve NPC and the scale factor SF of the second power control curve D_NPC may be the same.

In the method of operating the display device 1000, when the panel load PLD is greater than the critical panel load CPLD, power consumed by the display panel 110 may be reduced based on the first power control curve NPC. Accordingly, the panel load PLD may be reduced, and heat generation of the display panel 110 due to the panel load PLD may be decreased. In addition, when the panel load PLD is less than the critical panel load CPLD and the maximum block load BLD2 is greater than the critical block load CBLD, the power consumed by the display panel 110 may be reduced based on the second power control curve D_NPC. In other words, even when the panel load PLD is less than the critical panel load CPLD, the power may be controlled. Accordingly, in the display device 1000, even when the panel load PLD is less than the critical panel load CPLD, the panel load PLD may be reduced, and damage to the display panel 110 may be prevented.

Although certain embodiments and implementations of the present disclosure have been described herein, other embodiments and modifications will be apparent from this description. Accordingly, the inventive concepts are not limited to such embodiments.

What is claimed is:

1. A display device comprising: a display panel including a plurality of panel blocks; a block load calculator which calculates block loads of the panel blocks based on an input image data and determines a maximum block load among the block loads; a block load comparing part that determines if the maximum block load is less than a critical block load, and generates a first output image data based on the input image data when the maximum block load is less than the critical block load; a first load controller which generates a first power control curve and generates a second output image data based on the input image data and the first power control curve, when the maximum block load is greater than or equal to the critical block load; and wherein the first load controller comprises: a block load difference calculator which calculates a first block load difference between a first block load of a first panel block and the maximum block load, and calculates a second block load difference between a second block load of a second panel block and the maximum block load; a power control curve generator which generates the first power control curve based on the maximum block load, the first block load difference, and the second block load difference; and a load controller which generates the second output image data, based on the input image data and the first power control curve.

2. The display device of claim 1, wherein the first and second panel blocks are adjacent to a panel block having the maximum block load.

3. The display device of claim 1, further comprising:
a panel load calculator which calculates a panel load of the display panel based on the input image data; and
a panel load comparing part which compares the panel load and a critical panel load.

4. The display device of claim 3, wherein the panel load is equal to a sum of the block loads.

5. The display device of claim 3, wherein the block load calculator calculates the block loads and determines the maximum block load if the panel load is less than the critical panel load.

6. The display device of claim 3, wherein the block load calculator does not calculate the block loads if the panel load is greater than or equal to the critical panel load.

7. The display device of claim 3, further comprising:
a second load controller which generates a third output image data based on the input image data and a second power control curve when the panel load is greater than or equal to the critical panel load.

8. The display device of claim 1, further comprising:
a data driver which generates a data voltage based on the first output image data or the second output image data.

9. The display device of claim 1, wherein an area of each of the panel blocks is the same for each block.

10. The display device of claim 1, wherein the display panel includes four panel blocks.

11. A method of operating a display device, the method comprising: calculating block loads of panel blocks based on an input image data; determining a maximum block load among the block loads; generating a first output image data based on the input image data when the maximum block load is less than a critical block load; generating a second output image data based on the input image data and a first power control curve, when the maximum block load is greater than or equal to the critical block load; and wherein generating the second output image data comprises: calculating a first block load difference between a first block load of a first panel block and the maximum block load, and calculating a second block load difference between a second block load of a second panel block and the maximum block load; and generating the first power control curve based on the maximum block load, the first block load, and the second block load.

12. The method of claim 11, further comprising:
calculating a panel load of a display panel based on the input image data; and
comparing the panel load and a critical panel load,
before calculating the block loads of the panel blocks based on the input image data.

13. The method of claim 12, wherein the panel load is equal to a sum of the block loads.

14. The method of claim 12, wherein calculating the block loads of the parcel blocks based on the input image data is performed when the panel load is less than the critical panel load.

15. The method of claim 12, wherein calculating the block loads of the panel blocks based on the input image data is not performed when the panel load is greater than or equal to the critical panel load.

16. The method of claim 12, further comprising:
generating a third output image data based on the input image data and a second power control curve, when the panel load is greater than or equal to the critical panel load.

17. The method of claim 11, further comprising:
generating a data voltage based on the first output image data or the second output image data.

18. A display device, comprising: a display panel; a panel load calculator which calculates a panel load based on an input image data; a panel load comparing part that determines if the panel load is less than a critical panel load, and generates a first output image data based on the input image data when the panel load is less than the critical panel load; a first load controller which generates a second output image data based on the input image data and a first power control curve, when the panel load is greater than or equal to the critical panel load; and wherein the first load controller comprises: a block load difference calculator which calculates a first block load difference between a first block load of a first panel block and the maximum block load, and calculates a second block load difference between a second block load of a second panel block and the maximum block load; a power control curve generator which generates the first power control curve based on the maximum block load, the first block load difference, and the second block load difference; and a load controller which generates the second output image data, based on the input image data and the first power control curve.

* * * * *